(12) United States Patent
Bilger et al.

(10) Patent No.: US 8,543,831 B2
(45) Date of Patent: Sep. 24, 2013

(54) SYSTEM AND METHOD FOR ESTABLISHING DATA CONNECTIONS BETWEEN ELECTRONIC DEVICES

(75) Inventors: Christoph Bilger, Munich (DE); Rex Kho, Holzkirchen (DE); Achim Schramm, Munich (DE); Martin Maier, Diessen (DE); Yann Zinzius, Unterhaching (DE); Armin Kohlhase, Neubiberg (DE)

(73) Assignee: Qimonda AG, Munich (DE)

( * ) Notice: Subject to any disclaimer, the term of this patent is extended or adjusted under 35 U.S.C. 154(b) by 1072 days.

(21) Appl. No.: 11/939,892

(22) Filed: Nov. 14, 2007

(65) Prior Publication Data
US 2009/0125984 A1 May 14, 2009

(51) Int. Cl.
| G06F 21/00 | (2013.01) |
| G06F 7/04 | (2006.01) |
| G06F 15/16 | (2006.01) |
| G06F 17/30 | (2006.01) |
| H04L 29/06 | (2006.01) |
| H04B 7/00 | (2006.01) |
| H04H 20/71 | (2008.01) |
| H04K 1/00 | (2006.01) |

(52) U.S. Cl.
USPC ............. 713/186; 726/5; 455/41.2; 455/3.05; 380/270; 340/5.61; 340/5.62; 340/5.63; 340/5.64; 340/5.65; 340/5.66; 340/5.67

(58) Field of Classification Search
USPC ........................................................ 713/186
See application file for complete search history.

(56) References Cited

U.S. PATENT DOCUMENTS

| 5,081,678 | A | * | 1/1992 | Kaufman et al. | 713/161 |
| 5,600,722 | A | * | 2/1997 | Yamaguchi et al. | 713/155 |
| 6,070,240 | A | * | 5/2000 | Xydis | 726/17 |
| 6,213,391 | B1 | * | 4/2001 | Lewis | 235/380 |
| 6,480,957 | B1 | * | 11/2002 | Liao et al. | 713/170 |
| 6,732,278 | B2 | * | 5/2004 | Baird et al. | 726/7 |
| 6,763,315 | B2 | * | 7/2004 | Xydis | 702/127 |
| 6,961,541 | B2 | * | 11/2005 | Overy et al. | 455/41.2 |
| 6,996,714 | B1 | * | 2/2006 | Halasz et al. | 713/163 |
| 7,020,456 | B2 | * | 3/2006 | Smeets et al. | 455/411 |
| 7,061,366 | B2 | * | 6/2006 | Bell et al. | 340/5.2 |
| 7,117,370 | B2 | * | 10/2006 | Khan et al. | 713/186 |
| 7,130,584 | B2 | * | 10/2006 | Hirvonen | 455/41.2 |
| 7,136,999 | B1 | * | 11/2006 | Griffiths | 713/168 |
| 7,191,335 | B1 | * | 3/2007 | Maillard | 713/176 |
| 7,216,231 | B2 | * | 5/2007 | Gehrmann | 713/171 |
| 7,284,127 | B2 | * | 10/2007 | Gehrmann | 713/169 |
| 7,299,364 | B2 | * | 11/2007 | Noble et al. | 713/189 |
| 7,302,020 | B2 | * | 11/2007 | Bois et al. | 375/342 |
| 7,302,571 | B2 | * | 11/2007 | Noble et al. | 713/172 |
| 7,334,125 | B1 | * | 2/2008 | Pellacuru | 713/163 |
| 7,350,230 | B2 | * | 3/2008 | Forrest | 726/9 |
| 7,356,329 | B2 | * | 4/2008 | Willey et al. | 455/410 |

(Continued)

FOREIGN PATENT DOCUMENTS

EP 1282260 A1 * 2/2003

*Primary Examiner* — Carolyn B Kosowski
(74) *Attorney, Agent, or Firm* — Dicke, Billig & Czaja, PLLC (57) ABSTRACT

A system and method is disclosed, including establishing of data connections between electronic devices. One embodiment provides a method for establishing a data connection between a first and a second electronic device, wherein establishing the data connection is authorized by executing at least one action with at least one physical tool.

20 Claims, 4 Drawing Sheets

(56) References Cited

U.S. PATENT DOCUMENTS

| | | | |
|---|---|---|---|
| 7,375,615 B2* | 5/2008 | Kitagawa et al. | 340/5.81 |
| 7,418,594 B2* | 8/2008 | Tanaka et al. | 713/168 |
| 7,426,271 B2* | 9/2008 | Conley et al. | 380/33 |
| 7,475,244 B2* | 1/2009 | Sugikawa | 713/168 |
| 7,512,567 B2* | 3/2009 | Bemmel et al. | 705/67 |
| 7,516,484 B1* | 4/2009 | Arnouse | 726/9 |
| 7,543,156 B2* | 6/2009 | Campisi | 713/186 |
| 7,545,941 B2* | 6/2009 | Sovio et al. | 380/270 |
| 7,590,246 B2* | 9/2009 | Calmels et al. | 380/270 |
| 7,607,014 B2* | 10/2009 | Larson et al. | 713/168 |
| 7,664,961 B2* | 2/2010 | Blattner et al. | 713/186 |
| 7,788,494 B2* | 8/2010 | Aissi et al. | 713/171 |
| 7,793,109 B2* | 9/2010 | Ortiz | 713/186 |
| 7,827,291 B2* | 11/2010 | Holden et al. | 709/228 |
| 7,916,861 B2* | 3/2011 | Conley et al. | 380/33 |
| 8,079,068 B2* | 12/2011 | Adams | 726/9 |
| 8,132,236 B2* | 3/2012 | Hawkins et al. | 726/4 |
| 2002/0197979 A1* | 12/2002 | Vanderveen | 455/410 |
| 2003/0026428 A1* | 2/2003 | Loisel | 380/277 |
| 2003/0026433 A1* | 2/2003 | Matt | 380/278 |
| 2003/0030720 A1* | 2/2003 | Hutchings | 348/14.02 |
| 2003/0115474 A1* | 6/2003 | Khan et al. | 713/186 |
| 2005/0021940 A1* | 1/2005 | Ma | 713/155 |
| 2005/0134523 A1* | 6/2005 | Challener et al. | 345/1.1 |
| 2006/0085844 A1* | 4/2006 | Buer et al. | 726/4 |
| 2006/0140170 A1* | 6/2006 | Dorner | 370/352 |
| 2006/0156353 A1* | 7/2006 | Dorner | 725/86 |
| 2006/0209843 A1* | 9/2006 | Zhang et al. | 370/395.32 |
| 2006/0224901 A1* | 10/2006 | Lowe | 713/186 |
| 2006/0271788 A1* | 11/2006 | Chang et al. | 713/182 |
| 2007/0064935 A1* | 3/2007 | Ben-Yehuda | 380/44 |
| 2007/0067634 A1* | 3/2007 | Siegler | 713/171 |
| 2007/0143824 A1* | 6/2007 | Shahbazi | 726/1 |
| 2007/0277230 A1* | 11/2007 | Hawkins et al. | 726/4 |
| 2008/0022089 A1* | 1/2008 | Leedom | 713/156 |
| 2008/0120698 A1* | 5/2008 | Ramia | 726/4 |
| 2008/0263363 A1* | 10/2008 | Jueneman et al. | 713/184 |
| 2008/0301800 A1* | 12/2008 | Khan | 726/15 |
| 2009/0089580 A1* | 4/2009 | Sugikawa | 713/168 |
| 2009/0228707 A1* | 9/2009 | Linsky | 713/171 |
| 2010/0235884 A1* | 9/2010 | Ayatsuka et al. | 726/3 |

\* cited by examiner

SYSTEM AND METHOD FOR ESTABLISHING DATA CONNECTIONS BETWEEN ELECTRONIC DEVICES

BACKGROUND

Data connections provide a communication link between electronic devices. For example, a data connection between a mobile phone and a computer provides a communication link between the mobile phone and the computer. The data connection can be wired or wireless.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope. The following detailed description, therefore, is not to be taken in a limiting sense, and the scope is defined by the appended claims.

It is to be understood that the features of the various example embodiments described herein may be combined with each other, unless specifically noted otherwise.

Figure 1A:
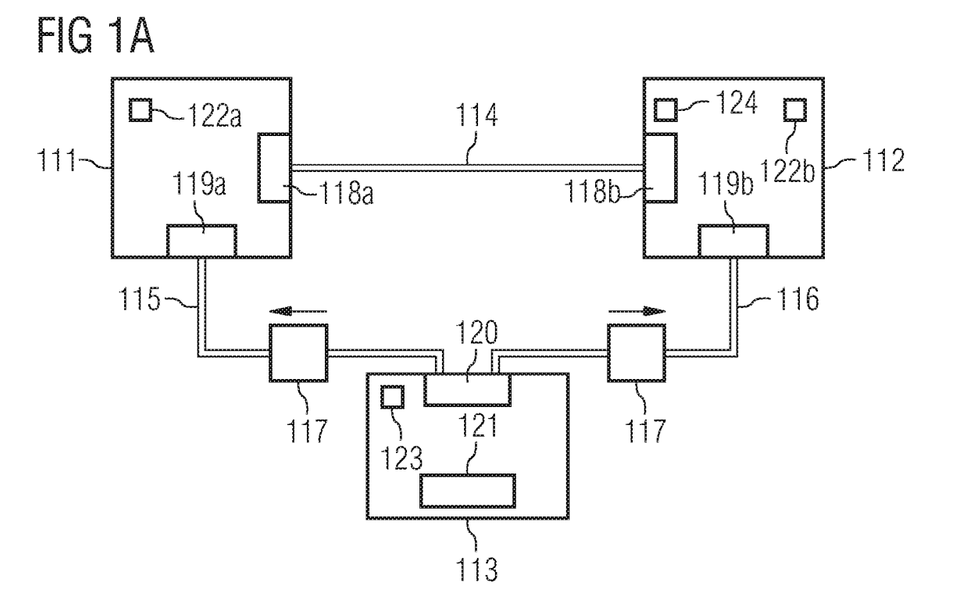
FIG. 1A illustrates a schematic view of two devices and a tool according to one embodiment.

FIG. 1A illustrates a schematic view of a first embodiment that demonstrates establishing of a first data connection 114 between a first device 111 that can be a mobile phone or another electronic device, and a second device 112 that can be a personal computer or another electronic device. The mobile phone 111 includes a first data communication equipment 118a. The personal computer 112 includes a further first data communication equipment 118b. The first data connection 114 can be established between the first data communication equipment 118a of the mobile phone 111 and the further first data communication equipment 118b of the personal computer 112. The first data connection 114 can be a Bluetooth connection, a wireless local area network (WLAN) connection or another kind of data connection. The first data communication equipments 118a, 118b are Bluetooth transceivers, WLAN transceivers or another kind of data communication equipments accordingly. Furthermore, the mobile phone 111 includes a second data communication equipment 119a and the personal computer 112 includes a further second data communication equipment 119b. Furthermore, the mobile phone 111 may include a first proximity sensor 122a and the personal computer 112 may include a second proximity sensor 122b. Furthermore, the personal computer 112 may include a first database 124 that holds a list of personal data that identifies users that are permitted to establish the first data connection 114.

In order to avoid un-authorized access to the mobile phone 111 and the personal computer 112, establishing of the first data connection 114 has to be authorized with a first tool 113. The first tool 113 can be an RFID tag or another appliance. The first tool 113 may hold first personal data 121 that allows to identify the tool owner. The first tool 113 includes a third data communication equipment 120. A second data connection 115 can be established between the third data communication equipment 120 of the first tool 113 and the second data communication equipments 119a of the mobile phone 111. A third data connection 116 can be established between the third data communication equipment 120 of the first tool 113 and the further second data communication equipments 119b of the personal computer 112. The first tool 113 may also include a third proximity sensor 123. The second and third data connections 115, 116 can be used to send a first code 117 from the first tool 113 to the mobile phone 111 and to the personal computer 112. The first code 117 may contain the first personal data 121 that identifies the tool owner. In a further embodiment the first code 117 may contain a secret random portion that is newly generated by the first tool 113 upon every attempt to connect two devices.

Figure 1B:
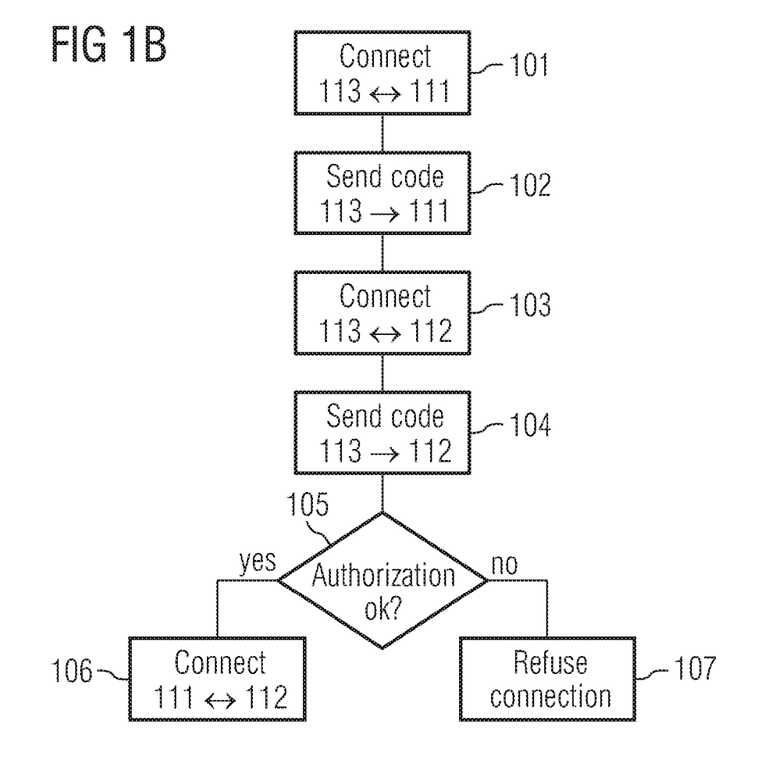
FIG. 1B illustrates a flow diagram depicting the processes performed to establish a connection between two devices according to one embodiment.

FIG. 1B illustrates a flow diagram depicting a method to establish a first data connection 114 between the mobile phone 111 and the personal computer 112 in accordance with the first embodiment. In a first process 101 the second data connection 115 is established between the first tool 113 and the mobile phone 111. The second data connection 115 can for example be established by bringing the first tool 113 into a designated region in the vicinity of the mobile phone 111. The approximation of the first tool 113 to the mobile phone 111 can be detected by the first tool 113 and the mobile phone 111 with the first and third proximity sensors 122a, 123. In another embodiment the second data connection 115 can be established by plugging the first tool 113 into the mobile phone 111, thereby creating an electric contact between the second data communication equipment 119a of the mobile phone 111 and the third data communication equipment 120 of the first tool 113 that is detected by the first tool 113 and the mobile phone 111. In a second process 102, after having established the second data connection 115, the first code 117 is sent from the first tool 113 to the mobile phone 111 via the second data connection 115. Therefore the third data communication equipment 120 of the first tool 113 may be an RFID circuit and the first tool 113 may modulate the first code 117 with the RFID circuit 120 onto a high frequency electric field generated by the second data communication equipment 119a of the mobile phone 111.

In a third process 103 the third data connection 116 is established between the first tool 113 and the personal computer 112. The third data connection 116 can for example be established by bringing the first tool 113 into a designated region in the vicinity of the personal computer 112. The approximation of the first tool 113 to the personal computer 112 can be detected by the first tool 113 and the personal computer 112 with the first and third proximity sensors 122b, 123. In another embodiment the third data connection 116 can be established by plugging the first tool 113 into the personal computer 112, thereby creating an electric contact between the second data communication equipment 119b of the personal computer 112 and the third data communication equipment 120 of the first tool 113 that is detected by the first tool 113 and the personal computer 112. In a fourth process 104, after having established the third data connection 116, the same first code 117 as in process 102 is sent from the first tool 113 to the personal computer 112 via the third data connection 116. Therefore the third data communication equipment 120 of the first tool 113 may be an RFID circuit and the first tool 113 may modulate the first code 117 with the RFID circuit 120 onto a high frequency electric field generated by the second data communication equipment 119b of the personal computer 112.

In a fifth process 105 the mobile phone 111 or the personal computer 112 or both devices verify if the owner of the first tool 113, identified by the first personal data 121 obtained with the first code 117, is permitted to establish the first data connection 114. To this end, the personal computer 112 looks up the first personal data 121 of the tool owner obtained with the first code 117 in the first database 124. If a matching database entry can be found, the tool owner is permitted to establish the first data connection 114.

If the check in the fifth process 105 has illustrated that the owner of the first tool 113 is permitted to establish the first data connection 114, in a sixth process 106 the mobile phone 111 and the personal computer 112 find the respective other device that has obtained the same first code 117 and establish the first data connection 114 between the mobile phone 111 and the personal computer 112. In the case that the first data communication equipments 118a, 118b are Bluetooth transceivers, in order to find the other device, the mobile phone 111 and the personal computer 112 may send out messages periodically via their first data communication equipments 118a, 118b and periodically check for messages received via their first data communication equipments 118a, 118b. If one of the two devices 111, 112 receives such a message it replies with a message containing the first code 117. If the other of the two devices 111, 112 has obtained an identical first code 117 in one of the previous processes 102, 104, it replies with an appropriate message and both devices 111, 112 set up a Bluetooth connection.

If the check in the fifth process 105 has illustrated that the owner of the first tool 113 is not permitted to establish the first data connection 114, establishing of the first data connection 114 between the mobile phone 111 and the personal computer 112 is refused, at 107.

The verification of the tool owner's permission to establish the first data connection 114 in the fifth process 105 can be left out in a simplified embodiment. The first code 117 sent in the second process 102 and the fourth process 104 does not need to contain the first personal data 121 then. The process to establish the first data connection 114 then continues after the fourth process 104 directly with the sixth process 106 in FIG. 1B.

In another embodiment the first tool 113 is a body part of a human such as a finger, an eye or a face, and the first personal data 121 is a biometric feature of the body part such as a fingerprint, an iris pattern or the geometry of the face that identifies the human. The second and the further second data communication equipments 119a, 119b are fingerprint scanners, iris scanner or optical cameras with face recognition capabilities accordingly. Sending of the first code 117 to the mobile phone 111 and the personal computer 112 in the second and fourth processes 102, 104 is achieved by scanning the body part 113 and recognizing the biometric feature 121 with the second and the further second data communication equipments 119a, 119b.

Figure 2A:
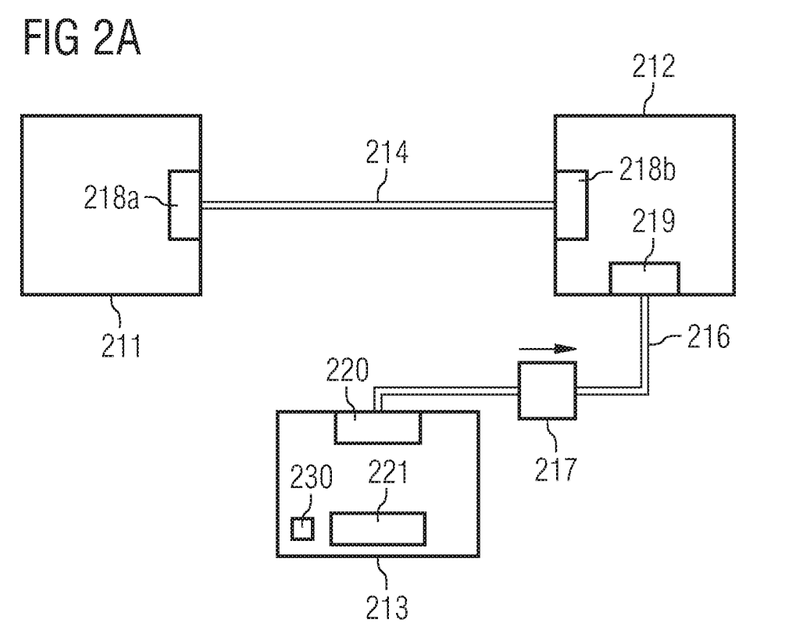
FIG. 2A illustrates a schematic view of two devices and a tool according to another embodiment.

FIG. 2A illustrates a schematic view of a second embodiment that demonstrates establishing of a fourth data connection 214 between a device 211 that can be a first video projector or another electronic device, and a device 212 that can be a first portable computer or another electronic device. The first video projector 211 includes a fourth data communication equipment 218a and the first portable computer 212 includes a further fourth data communication equipment 218b. The fourth data connection 214 can be established between the fourth data communication equipment 218a of the first first video projector 211 and the fourth data communication equipment 218b of the first portable computer 212. The fourth data connection 214 can be a wireless local area network (WLAN) connection or another kind of data connection. The fourth and the further fourth data communication equipments 218a, 218b are WLAN transceivers or another kind of data communication equipment accordingly. Furthermore, the first portable computer 212 includes a fifth data communication equipment 219.

In order to establish the fourth data connection 214 between the first portable computer 212 and the first video projector 211, establishing of the fourth data connection 214 has to be authorized with a tool 213 that can be a remote control of the first video projector 211 or another appliance. The remote control 213 may hold an identification key 221 that assigns it to the first video projector 211. Furthermore, the remote control 213 may include a button 230. Furthermore, the remote control 213 includes a sixth data communication equipment 220. A fifth data connection 216 can be established between the sixth data communication equipment 220 of the remote control 213 and the fifth data communication equipments 219 of the first portable computer 212. The fifth data connection 216 can be a Bluetooth connection or an infrared connection (IrDA) or another kind of data connection. The fifth data communication equipment 219 and the sixth data communication equipment 220 are Bluetooth transceivers, IrDA transceivers or another kind of data communication equipment accordingly. The fifth data connection 216 can be used to send a second code 217 from the remote control 213 to the first portable computer 212. The second code 217 may contain the identification key 221.

Figure 2B:
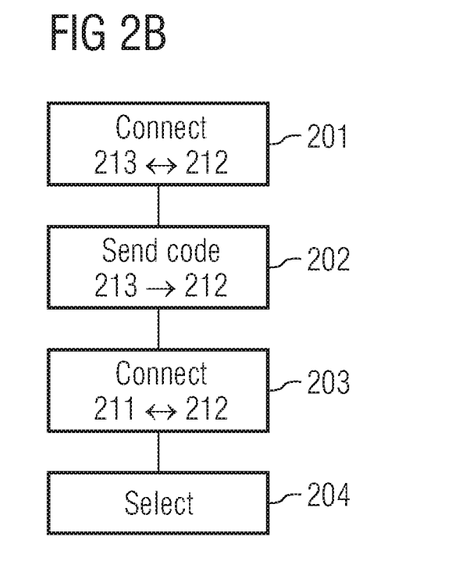
FIG. 2B illustrates a flow diagram depicting the processes performed to establish a connection between two devices according to another embodiment.

FIG. 2B illustrates a flow diagram depicting a method to establish the fourth data connection 214 between the first portable computer 212 and the first video projector 211 in accordance with this second embodiment. In a first process 201 the fifth data connection 216 is established between the remote control 213 and the first portable computer 212. The fifth data connection 216 may be established by pressing a button 230 on the remote control 213 or in another way. In a second process 202 the second code 217 is sent from the remote control 213 to the first portable computer 212 via the fifth data connection 216. In a third process 203 the first portable computer 212 finds the first video projector 211 and the fourth data connection 214 is established between the first portable computer 212 and the first video projector 211. The first portable computer 212 may find the first video projector 211 with the aid of the identification key 221 obtained with the second code 217 in the second process 202. In one embodiment of the invention the identification key 221 may be the service set identifier of a WLAN access point integrated into the first video projector 211 and the mobile computer 212 establishes the fourth data connection 214 with the first video projector 211 using this service set identifier. In a fourth process 204 the first portable computer 212 selects the first video projector 211 as its output device and the first video projector 211 selects the first portable computer 212 as its input device.

Figure 3A:
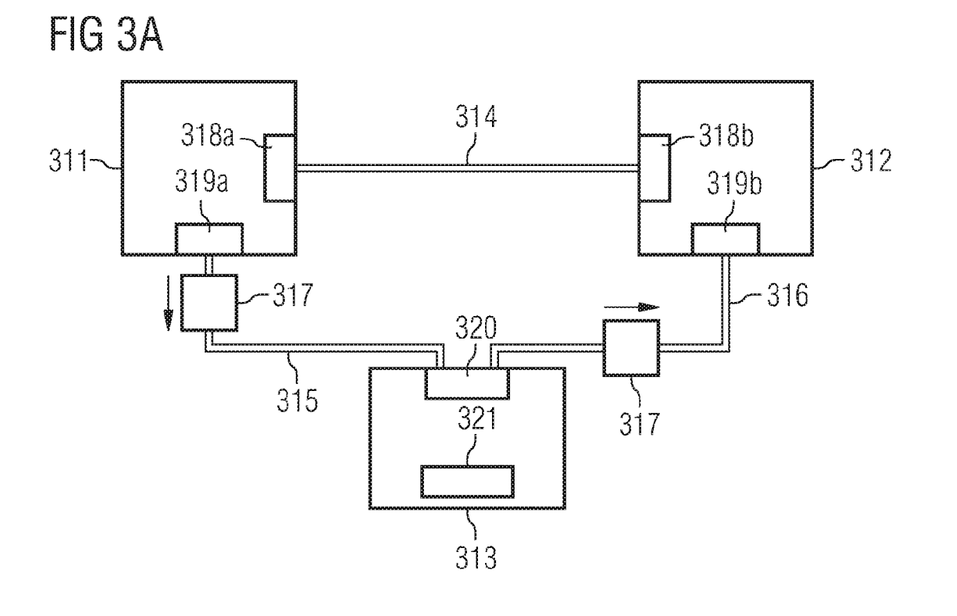
FIG. 3A illustrates a schematic view of two devices and a tool according to another embodiment.

FIG. 3A illustrates a schematic view of a third embodiment that demonstrates another way of establishing of a sixth data connection 314 between a device 311 that can be a second video projector or another electronic device, and a device 312 that can be a second portable computer or another electronic device. The second video projector 311 includes a seventh data communication equipment 318a and the second portable computer 312 includes a further seventh data communication equipment 318b. The sixth data connection 314 can be established between the seventh data communication equipment 318a of the second second video projector 311 and the further seventh data communication equipment 318b of the second portable computer 312. The sixth data connection 314 can be a wireless local area network (WLAN) connection or another kind of data connection. The seventh and further seventh data communication equipments 318a, 318b are WLAN transceivers or another kind of data communication equipment accordingly. Furthermore, the second video projector 311 includes an eighth data communication equipment 319a and the second portable computer 312 includes a further eighth data communication equipment 319b.

In order to establish the sixth data connection 314 between the second video projector 311 and the second portable computer 312, it has to be authorized with a second tool 313. The second tool 313 includes a data memory 321 where data can be stored and read out. The second tool 313 also includes a ninth data communication equipment 320. A seventh data connection 315 can be established between the ninth data communication equipment 320 of the second tool 313 and the eighth data communication equipment 319a of the second video projector 311. An eighth data connection 316 can be established between the ninth data communication equipment 320 of the second tool 313 and the further eight data communication equipment 319b of the second portable computer 312. The seventh and eighth data connections 315, 316 can be Bluetooth connections or infrared connections (IrDA) or electrical connections or other kinds of data connections. The eighths, further eight and ninth data communication equipments 319a, 319b, 320 are Bluetooth transceivers, IrDA transceivers or electrical connectors or other kinds of data communication equipments accordingly. The seventh data connection 315 can be used to send a third code 317 from the second video projector 311 to the second tool 313. The eighth data connection 316 can be used to send the third code 317 from the second tool 313 to the second portable computer 312.

Figure 3B:
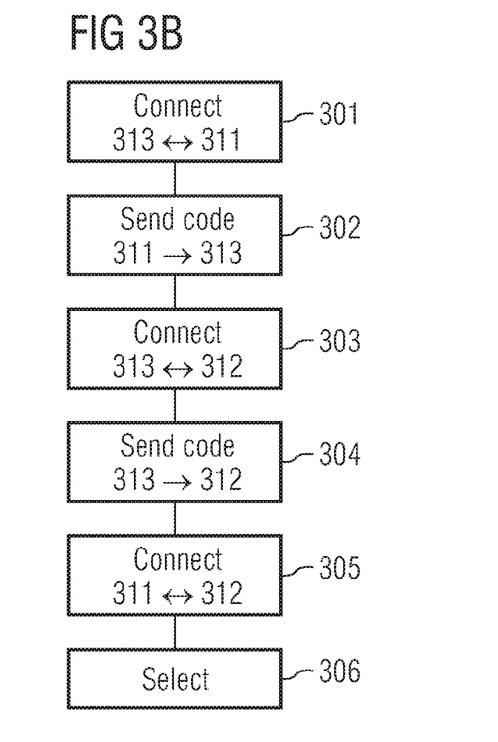
FIG. 3B illustrates a flow diagram depicting the processes performed to establish a connection between two devices according to another embodiment.

FIG. 3B illustrates a flow diagram depicting a method to establish the sixth data connection 314 between the second portable computer 312 and the second video projector 311 according to the third embodiment.

In a first process 301 the seventh data connection 315 is established between the second tool 313 and the second video projector 311. The seventh data connection 315 can for example be established by plugging the second tool 313 into the second video projector 311, thereby creating an electric contact between the ninth data communication equipment 320 of the second tool 313 and the eighth data communication equipment 319a of the second video projector 311 that is detected by the second tool 313 and the second video projector 311.

In a second process 302 the third code 317 is sent from the second video projector 311 to the second tool 313 via the seventh data connection 315 and stored in the memory area 321 of the second tool 313. In another embodiment of the invention the third code 317 contains a secret random portion that is newly generated by the second video projector 311 upon every attempt to connect the second video projector 311 with another device.

In a third process 303 the eighth data connection 316 is established between the second tool 313 and the second portable computer 312. The eighth data connection 316 can be established by plugging the second tool 313 into the second portable computer 312, thereby creating an electric contact between the ninth data communication equipment 320 of the second tool 313 and the further eighth data communication equipment 319b of the second portable computer 312 that is detected by the second tool 313 and the second portable computer 312.

In a fourth process 304 the third code 317 obtained in process 302 is read back from the memory area 321 by the second tool 313 and sent to the second portable computer 312 via the eighth data connection 316.

In a fifth process 305 the second video projector 311 and the second portable computer 312 find the respective other device that holds the identical third code 317 and establish the sixth data connection 314. The second portable computer 312 may find the second video projector 311 with the aid of the third code 317 obtained in the fourth process 304. In one embodiment of the invention the third code 317 may be the service set identifier of a WLAN access point integrated into the second video projector 311 and the mobile computer 312 establishes the sixth data connection 314 with the second video projector 311 using this service set identifier.

In a sixth process 306 the second portable computer 312 selects the second video projector 311 as its output device and the second video projector 311 selects the second portable computer 312 as its input device.

Figure 4A:
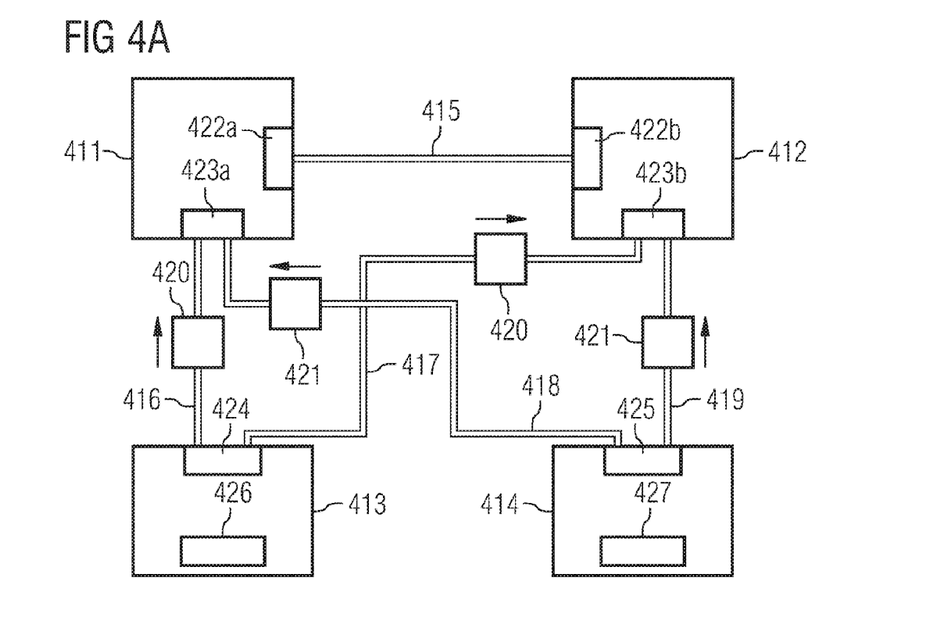
FIG. 4A illustrates a schematic view of two devices and two tools according to another embodiment.

FIG. 4A illustrates a schematic view of a fourth embodiment. A device 411 can be a third portable computer or another electronic device. A device 412 can be a fourth portable computer or another electronic device. The third portable computer 411 includes a tenth data communication equipment 422a and the fourth portable computer 412 includes a further tenth data communication equipment 422b. A ninth data connection 415 can be established between the tenth and the further tenth data communication equipment 422a, 422b of the third and fourth portable computers 411, 412. The ninth data connection 415 can be a Bluetooth connection, a wireless local area network (WLAN) connection or another kind of data connection. The tenth and the further tenth data communication equipment 422a, 422b are Bluetooth transceivers, WLAN transceivers or another kind of data communication equipment accordingly. Furthermore, the third portable computer 411 includes an eleventh data communication equipment 423a and the fourth portable computer 412 includes a further eleventh data communication equipment 423b.

In order to establish the ninth data connection 415 between the third and the fourth portable computer 411, 412, the two owners of the third and the fourth portable computer 411, 412 have to authorize the ninth data connection 415. To this end the owner of the third portable computer 411 has a third tool 413 that holds third personal data 426 on the owner of the third portable computer 411 and the owner of the fourth portable computer 412 has a fourth tool 414 that holds fourth personal data 427 on the owner of the fourth portable computer 412. The third and fourth tools 413, 414 can be RFID tags or other appliances. The third tool 413 includes a twelfth data communication equipment 424 that can be used to establish a tenth data connection 416 with the third portable computer 411 via the eleventh data communication equipment 423a of the third portable computer 411 and to establish a eleventh data connection 417 with the fourth portable computer 412 via the further eleventh data communication equipment 423b of the fourth portable computer 412. The fourth tool 414 includes a thirteenth data communication equipment 425 that can be used to establish a twelfth data connection 418 with the third portable computer 411 via the eleventh data communication equipment 423a of the third portable computer 411 and to establish a thirteenth data connection 419 with the fourth portable computer 412 via the further eleventh data communication equipment 423b of the fourth portable computer 412. The tenth and eleventh data connections 416, 417 can be used to send a fourth code 420 from the third tool 413 to the third and fourth portable computers 411, 412. The fourth code 420 contains the third personal data 426 that identifies the owner of the third portable computer 411. The twelfth and thirteenth data connections 418, 419 can be used to send a fifth code 421 from the fourth tool 414 to the third and fourth portable computers 411, 412. The fifth code 421 contains the fourth personal data 427 that identifies the owner of the fourth portable computer 412. In a preferred embodiment the fourth and fifth codes 420, 421 contain secret random portions that are newly generated by the third and fourth tools 413, 414 upon every attempt to connect two devices.

Figure 4B:
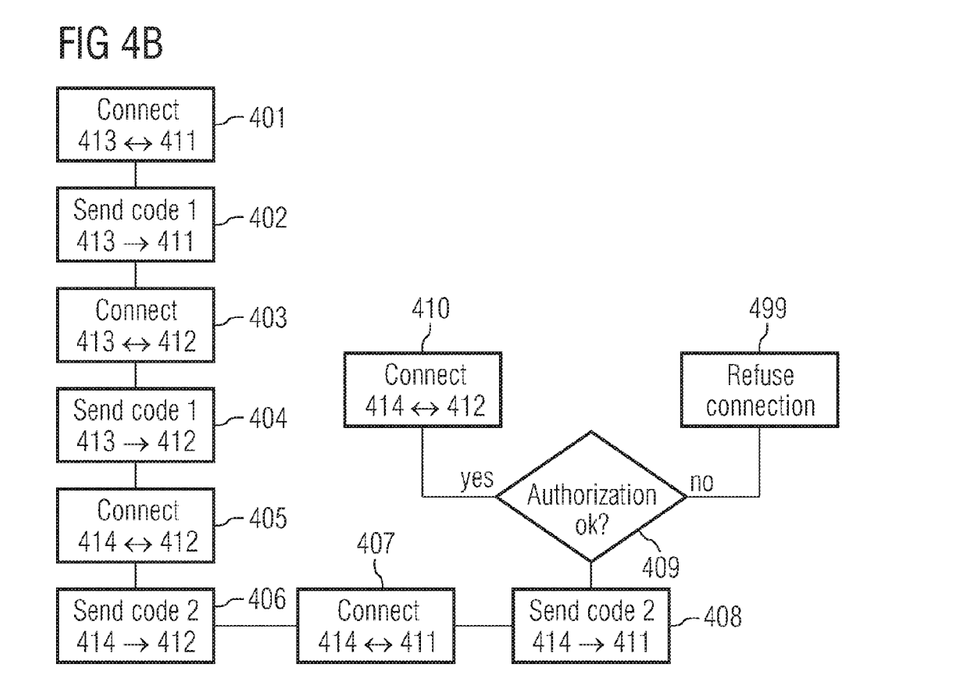
FIG. 4B illustrates a flow diagram depicting the processes performed to establish a connection between two devices according to another embodiment.

FIG. 4B illustrates a flow diagram depicting a method to establish the ninth data connection 415 between the third and the fourth portable computer 411, 412 according to this fourth embodiment.

In a first process 401 the tenth data connection 416 is established between the third tool 413 and the third portable computer 411. The tenth data connection 416 can for example be established by bringing the third tool 413 into a designated region in the vicinity of the third portable computer 411. In case the third tool 413 is an RFID tag the tenth data connection 416 may for example be established by bringing the third tool 413 close enough to the third portable computer 411 to allow the eleventh data communication equipment 423a of the third portable computer 411 to communicate with the twelfth data communication equipment 424 of the third tool 413. In another embodiment the tenth data connection 416 can be established by plugging the third tool 413 into the third portable computer 411, thus creating an electrical connection between the eleventh data communication equipment 423a of the third portable computer 411 and the twelfth data communication equipment 424 of the third tool 413.

In a second process 402 the fourth code 420 containing the third personal data 426 about the owner of the third portable computer 411 is sent from the third tool 413 to the third portable computer 411 via the tenth data connection 416. In case the third tool 413 is an RFID tag and the twelfth data communication equipment 424 of the third tool 413 is an RFID circuit, the third tool 413 modulates the fourth code 420 with the RFID circuit 424 onto a high frequency electric field generated by the eleventh data communication equipment 423a of the third portable computer 411.

In a third process 403 the eleventh data connection 417 is established between the third tool 413 and the fourth portable computer 412. The eleventh data connection 417 can for example be established by bringing the third tool 413 into a designated region in the vicinity of the fourth portable computer 412. In case the third tool 413 is an RFID tag the eleventh data connection 417 may for example be established by bringing the third tool 413 close enough to the fourth portable computer 412 to allow the further eleventh data communication equipment 423b of the fourth portable computer 412 to communicate with the twelfth data communication equipment 424 of the third tool 413. In another embodiment the eleventh data connection 417 can be established by plugging the third tool 413 into the fourth portable computer 412, thus creating an electrical connection between the further eleventh data communication equipment 423b of the fourth portable computer 412 and the twelfth data communication equipment 424 of the third tool 413.

In a fourth process 404 the same fourth code 420 as in process 402 is sent from the third tool 413 to the fourth portable computer 412 via the eleventh data connection 417. In case the third tool 413 is an RFID tag and the twelfth data communication equipment 424 of the third tool 413 is an RFID circuit, the third tool 413 modulates the fourth code 420 with the RFID circuit 424 onto a high frequency electric field generated by the further eleventh data communication equipment 423b of the fourth portable computer 412.

In a fifth process 405 the thirteenth data connection 419 is established between the fourth tool 414 and the fourth portable computer 412. The thirteenth data connection 419 can for example be established by bringing the fourth tool 414 into a designated region in the vicinity of the fourth portable computer 412. In case the fourth tool 414 is an RFID tag the thirteenth data connection 419 may for example be established by bringing the fourth tool 414 close enough to the fourth portable computer 412 to allow the further eleventh data communication equipment 423b of the fourth portable computer 412 to communicate with the thirteenth data communication equipment 425 of the fourth tool 414. In another embodiment the thirteenth data connection 419 can be established by plugging the fourth tool 414 into the fourth portable computer 412, thus creating an electrical connection between the further eleventh data communication equipment 423b of the fourth portable computer 412 and the thirteenth data communication equipment 425 of the fourth tool 414.

In a sixth process 406 the fifth code 421 containing the fourth personal data 427 about the owner of the fourth portable computer 412 is sent from the fourth tool 414 to the fourth portable computer 412 via the thirteenth data connection 419. In case the fourth tool 414 is an RFID tag and the thirteenth data communication equipment 425 of the fourth tool 414 is an RFID circuit, the fourth tool 414 modulates the fifth code 421 with the RFID circuit 425 onto a high frequency electric field generated by the further eleventh data communication equipment 423b of the fourth portable computer 412.

In a seventh process 407 the twelfth data connection 418 is established between the fourth tool 414 and the third portable computer 411. The twelfth data connection 418 can for example be established by bringing the fourth tool 414 into a designated region in the vicinity of the third portable computer 411. In case the fourth tool 414 is an RFID tag the twelfth data connection 418 may for example be established by bringing the fourth tool 414 close enough to the third portable computer 411 to allow the eleventh data communication equipment 423a of the third portable computer 411 to communicate with the thirteenth data communication equipment 425 of the fourth tool 414. In another embodiment the twelfth data connection 418 can be established by plugging the fourth tool 414 into the third portable computer 411, thus creating an electrical connection between the eleventh data communication equipment 423a of the third portable computer 411 and the thirteenth data communication equipment 425 of the fourth tool 414.

In an eighth process 408 the same fifth code 421 as in the sixth process 406 is sent from the fourth tool 414 to the third portable computer 411 via the twelfth data connection 418. In case the fourth tool 414 is an RFID tag and the thirteenth data communication equipment 425 of the fourth tool 414 is an RFID circuit, the fourth tool 414 modulates the fifth code 421 with the RFID circuit 425 onto a high frequency electric field generated by the eleventh data communication equipment 423a of the third portable computer 411.

In a ninth process 409 the third portable computer 411 or the fourth portable computer 412 or both verify if the persons identified by the third and fourth personal data 426, 427 obtained with the fourth and fifth codes 420, 421 are permitted to establish the ninth data connection 415. The third portable computer 411 verifies if the person identified by the third personal data 426, obtained with the fourth code 420 in the second process 402, is the true owner of the third portable computer 411. If so, in a tenth process 410 the third portable computer 411 opens the connection 415 to the computer that belongs to the person identified by the fourth personal data 427, obtained with the fifth code 421 in the seventh process 407. In the ninth process 409 also the fourth portable computer 412 verifies if the person identified by the fourth personal data 427, obtained with the fifth code 421 in the sixth process 406, is the true owner of the fourth portable computer 412. If so, in the tenth process 410 the fourth portable computer 412 accepts the connection 415 by the computer that belongs to the person identified by the third personal data 426, obtained with the fourth code 420 in the fourth process 404.

If the person identified by the third personal data 426 is not recognized as the true owner of the third portable computer 411 in the ninth process 409, or the person identified by the fourth personal data 427 is not recognized as the true owner of the fourth portable computer 412 in the ninth process 409, establishing of the ninth data connection 415 is refused in an eleventh process 499.

The preceding description describes advantageous example embodiments. The features disclosed therein and the claims and the drawings can, therefore, be useful for realizing various embodiments, both individually and in any combination. While the foregoing is directed to specific embodiments, other and further embodiments may be devised without departing from the basic scope, the scope being determined by the claims that follow.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
    defining a first electronic device and a second electronic device; and
    establishing a first wireless data connection between the first and the second electronic device, wherein establishing the first wireless data connection is authorized by executing at least one action with a physical tool separate from the first and second electronic devices,
    wherein prior to establishing the first wireless data connection:
        establishing a second wireless data connection between the physical tool and the first electronic device; and
        transferring a code from the physical tool to the first electronic device;
    wherein establishing of the first wireless data connection is authorized by the fact that the first electronic device possesses the code obtained before.

2. The method of claim 1, wherein the physical tool holds personal data that identifies at least one user.

3. The method of claim 1, wherein the physical tool creates a fresh code for each attempt to connect two electronic devices.

4. The method of claim 1, wherein the physical tool uses the same code for all attempts to connect two electronic devices.

5. The method of claim 1, comprising permanently associating the physical tool with the first of the two electronic devices.

6. The method of claim 1, wherein the executed action is a physical action executed by a human.

7. The method of claim 1, comprising establishing the data connection between the physical tool and one of the electronic devices by bringing the physical tool into a designated region in the vicinity of the electronic device, wherein the physical tool is detected by the electronic device if the physical tool is in the vicinity of the electronic device.

8. The method of claim 1, comprising establishing the data connection between the physical tool and one of the electronic devices by bringing the physical tool into a designated region in the vicinity of the electronic device, wherein the electronic device is detected by the physical tool if the physical tool is in the vicinity of the electronic device.

9. The method of claim 1, wherein the data connection between the physical tool and one of the electronic devices is bidirectional.

10. The method of claim 1, wherein the data connection between the physical tool and one of the electronic devices is unidirectional.

11. The method of claim 1, wherein the data connection between the physical tool and one of the electronic devices uses a mechanical, optical or electrical connection.

12. The method of claim 1, wherein the physical tool is a biometric feature, wherein establishing of the data connection is authorized by a scan of the biometric feature.

13. The method of claim 12, wherein the biometric feature is a fingerprint.

14. The method of claim 12, wherein the biometric feature is an iris pattern of an eye.

15. A method comprising:
    defining a first electronic device and a second electronic device; and
    establishing a first wireless data connection between the first and the second electronic device, wherein establishing the first wireless data connection is authorized by executing at least one action with a physical tool separate from the first and second electronic devices, wherein prior to establishing the first wireless data connection:
establishing a second wireless data connection between the physical tool and the first electronic device;
transferring a first code from the physical tool to the first electronic device;
establishing a third wireless data connection between the physical tool and the second electronic device; and
transferring the first code from the physical tool to the second electronic device;
wherein establishing of the first wireless data connection is authorized by the fact that both electronic devices possess the first code obtained before.

16. The method of claim 15, the method further comprising:
establishing a fourth wireless data connection between a second physical tool and the second electronic device;
transferring a second code from the second physical tool to the second electronic device;
establishing a fifth wireless data connection between the second physical tool and the first electronic device; and
transferring the second code from the second physical tool to the first electronic device,
wherein establishing of the first wireless data connection is authorized by the fact that both electronic devices possess the first and second code obtained before.

17. The method of claim 16, wherein the first and second codes contain data that identifies the owners of the two physical tools and/or the two electronic devices.

18. A system comprising:
a first electronic device;
a second electronic device; and
a physical tool separate from the first and second electronic devices, wherein establishing of a first wireless data connection between the first electronic device and the second electronic device can be authorized by execution of an action with the physical tool,
wherein prior to establishing the first wireless data connection between the first and the second electronic device, establishing a second wireless data connection and exchange of data between the physical tool and each of the two electronic devices by bringing the physical tool into a designated region in the vicinity of each of the two electronic devices.

19. A system comprising:
a physical tool comprising data communication equipment, the physical tool configured to perform an action, wherein execution of the action authorizes establishing of a first wireless data connection between a first electronic device and a second electronic device, the physical tool being separate from the first and second electronic devices,
wherein the physical tool is configured to establish a second wireless data connection between the physical tool and the second electronic device and transfer a code from the physical tool to the second electronic device prior to establishing the first wireless data connection, and
wherein establishing of the first wireless data connection is authorized by the fact that the second electronic device possesses the code obtained before.

20. An electronic device, comprising:
data communication equipment configured such that a first wireless data connection is established between the electronic device and a second electronic device, wherein establishing of the first wireless data connection has to be authorized by execution of at least one action with at least one physical tool separate from the electronic device and the second electronic device,
wherein the physical tool is configured to establish a second wireless data connection between the physical tool and the electronic device, transfer a code from the electronic device to the physical tool, establish a third wireless data connection between the physical tool and the second electronic device, and transfer the code from the physical tool to the second electronic device prior to establishing the first wireless data connection, and
wherein establishing of the first wireless data connection is authorized by the fact that both electronic devices possess the code transferred before.

* * * * *